Figure 1:
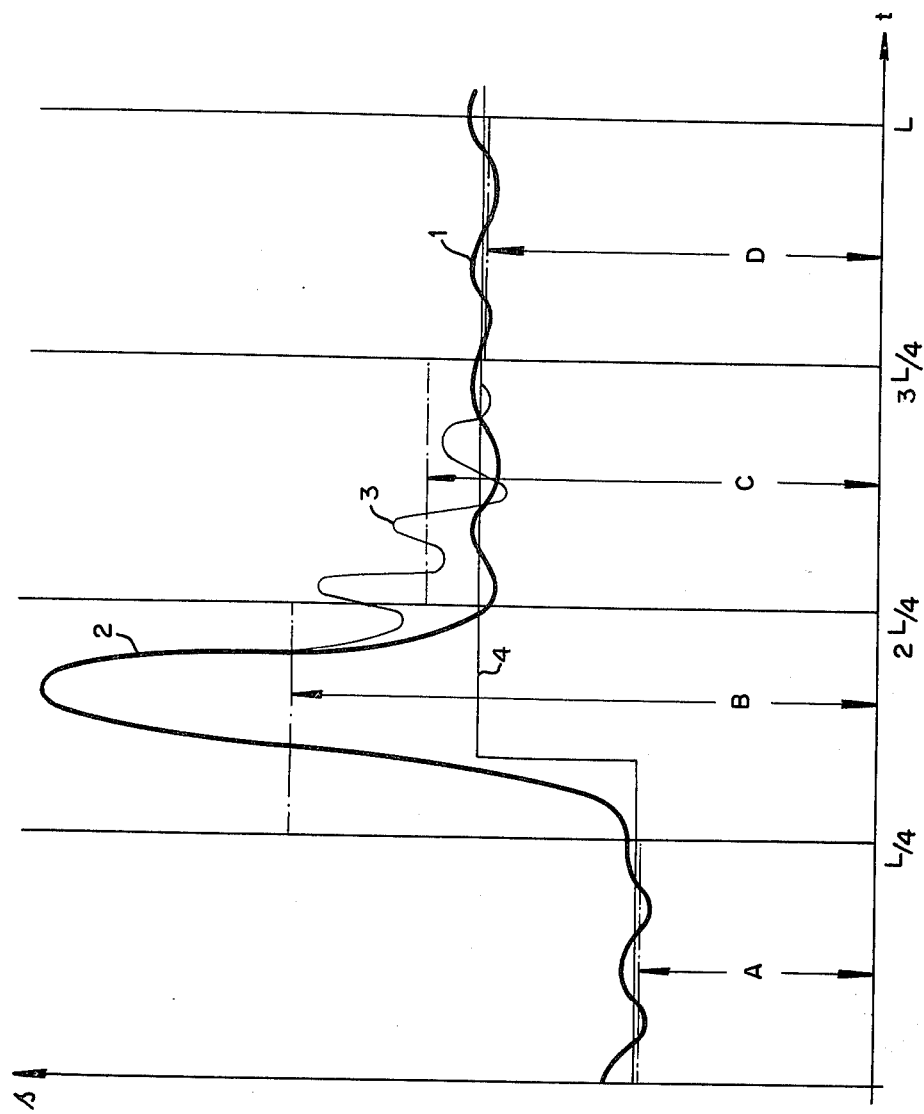

United States Patent [19]
Santucci

[11] 3,941,986
[45] Mar. 2, 1976

[54] ELECTRONIC DEVICE FOR AUTOMATICALLY AND CONTINUOUSLY ADJUSTING THE HEIGHT OF A SHEARING PILE OF TEXTILE ARTICLES HAVING A DIFFERING THICKNESS

[75] Inventor: Nicola Santucci, Schio, Italy

[73] Assignee: Nuovo Pignone S.p.A., Via Matteucci, Italy

[22] Filed: June 11, 1974

[21] Appl. No.: 478,373

[30] Foreign Application Priority Data
June 12, 1973 Italy .................................. 25205/73

[52] U.S. Cl. .............. 235/151.1; 26/17; 83/925 CC
[51] Int. Cl.² .................. G06F 15/46; D06C 23/02
[58] Field of Search ...... 235/151.1, 151; 340/172.5; 26/7, 15 R, 17, 15; 83/925, 925 CC

[56] References Cited
UNITED STATES PATENTS

| | | | |
|---|---|---|---|
| 3,534,188 | 10/1970 | Holm et al. ........................ | 26/17 X |
| 3,769,666 | 11/1973 | Kaufman ............................ | 26/15 R |
| 3,803,960 | 4/1974 | Pearl et al. ...................... | 83/925 CC |
| 3,823,629 | 7/1974 | Bleimund ........................ | 83/925 CC |

*Primary Examiner*—Joseph F. Ruggiero

[57] ABSTRACT

A device is described which permits automatic, uniform, and precise shearing of cloth pieces, including those areas near the seams, and which thus minimizes the economic loss due to non-sheared areas of cloth. The device employs the logic processing of information continuously delivered by a detector which measures the thickness of the cloth at a point before it reaches the shearing cylinder. This information is processed in an electronic system so as to adjust properly the width of the shearing slit in synchronism with the movement of the cloth. By the technique described herein, spurious signals of thickness information caused by the presence of a seam are discarded and replaced by certain fictitious signals that will bring about the desired height of pile in the sheared cloth in the areas near the seams, while nevertheless permitting the seam to pass through the shearing slit.

5 Claims, 3 Drawing Figures

ELECTRONIC DEVICE FOR AUTOMATICALLY AND CONTINUOUSLY ADJUSTING THE HEIGHT OF A SHEARING PILE OF TEXTILE ARTICLES HAVING A DIFFERING THICKNESS

The present invention relates to an electronic device suitable for use in the logic processing of information detected by a system which measures the thickness of cloth pieces to be sheared, so as to obtain automatic, uniform and precise shearing of said cloth pieces even near their seams and to minimize the non-sheared cloth piece portions which have to be cut out with consequent economic loss.

As presently known, the shearing operation — i.e., the regularization of the height of the pile of a textile article between zero (complete shaving for showing the weaving design and the interlacing of threads in cloth) and a certain value-is carried out industrially by sewing together several cloth pieces having differing thickness, so as to obtain a single cloth piece of a length sufficient to allow continuous working; said single cloth piece is made to pass between a rotating shearing cylinder and a lower guide comb, the distance between which the shearing slit is adjusted in light of the desired height of the pile and the thickness of the cloth piece.

Devices for automatically adjusting the height of the shearing slit are known in the prior art. These devices make use of a system that measures either continuously or non-continuously the thickness of the cloth piece; the system is located at a certain distance L along the cloth before it reaches the shearing cylinder. The measurement signals are directly sent after a suitable time delay to a regulator which compares said signals with those delivered by a device detecting the shearing slit height; the height of the shearing slit is automatically adjusted according to the difference between the values of said signals and the pre-determined value of the pile height. However, all of these known devices include various drawbacks to their use, said drawbacks arising more or less from the fact that the signals from the system measuring the thickness of the cloth piece are directly sent to an automatic regulator without processing. In fact, a length of cloth is never of perfectly constant thickness, but rather always includes small irregularities in the yarn; these irregularities are detected by the system measuring the thickness so that the consequent hunting of said measuring system alters the regular shearing cut and does not allow uniform height of the pile to be obtained. On the other hand, referring to FIG. 1 where thick line 1 graphically indicates the actual configuration of the thickness of a long cloth piece to be sheared, it is to be noted that, because of the spurious huntings inevitably produced in the system measuring the thickness by the passage of a seam 2, said measuring system delivers spurious thickness information (curve 3) which, if utilized, would give rise to faulty shearing of the cloth piece in the zone near the seam. The devices known by the prior art overcome the latter drawback by delaying in time the closing of the shearing slit after the seam passes under the shearing cylinder so that the spurious thickness information 3 is not used for adjusting the height of the shearing slit. Nevertheless, a wide zone near the seam is not sheared with a consequent economic loss.

It is an object of the present invention to eliminate the above-mentioned drawbacks and hence to provide a device that allows a precise and uniform regularization of the height of the pile of cloth pieces, even near their seams, by the logic processing of information continuously delivered by the detector system measuring the thickness before said information is sent to the automatic regulator which adjust the height of the shearing slit.

The desired result is obtained due to the fact that the value indicating the thickness of the cloth piece is no longer given directly by the detector system continuously measuring the thickness, but rather is obtained by taking the arithmetic mean of several thickness measurements made on a short portion of the moving cloth piece at constant time intervals; that the spurious thickness information corresponding to the zones adjacent to the seam is cancelled and replaced by other thickness information extrapolated through logic processing. In other words, distance L between the thickness detector system and the shearing cylinder is ideally divided into a certain number of equal parts, for example four parts (see FIG. 1), and the arithmetic mean of the thicknesses of every piece portion having a length of L/4 is taken as a measure of the thickness; said arithmetic mean is obtained by adding in a processor, for example the eight thickness measurements delivered by the detector system continuously measuring the thickness of the cloth piece at time intervals corresponding to an advance of the cloth piece a distance L/32. The mean thickness values of each portion L/4 of the cloth piece have been indicated by the values A, B, C and D, respectively, in FIG. 1.

On the other hand, the spurious values of mean thickness B and C are cancelled and opportunely replaced by the proper values A and D so as to obtain a fictitious thickness signal such as represented by curve 4 in FIG. 1. Thus, when the shearing slit is completely opened for allowing the seam to pass, a fictitious thickness signal D is registered into the regulator so that, after the seam passing the slit, the height of the shearing slit is immediately adjusted to a value as actually required by the cloth piece for uniform shearing of the piece portion located immediately following the seam.

The electronic device suitable for operation as above includes according to the invention, a set of main shift registers equal in number to the parts into which distance L, between the detector system measuring the thickness and the rotating shearing cylinder, is divided. It also includes a system for taking the arithmetic mean of the digital thickness signals corresponding to each of said parts into which distance L is divided. It further includes a system for detecting the presence of a seam and for cancelling and replacing the spurious digital signals of the mean thickness values corresponding to the part containing the seam and to the part immediately following that part: the value for the part containing the seam is replaced by the digital mean thickness value for the part immediately preceding that part; the value for the part immediately following the part containing the seam is replaced by the digital mean thickness value for the next following part. And it further includes a system for substituting the digital mean thickness signal corresponding to that next following part for the value for the part containing the seam as soon as the seam passes; under the rotating shearing cylinder.

According to another embodiment of the invention, use is made of four main shift registers connected in series and controlled by clock pulses of L/4, i.e. pulses having a period of recurrence equal to the time interval during which the cloth piece advances a length equal to each of the parts into which said distance L has been divided, so that the information is recorded into the cell of one main shift register, and passes into the cell of the following main shift register only when said portion L/40 of the cloth piece to be sheared has shifted a distance L/4. In such a way the mean information is advanced in synchronism with the advance of the cloth piece and is presented to the regulator in phase with said cloth piece.

According to another embodiment of the invention said system for taking the arithmetic mean of the digital thickness signals corresponding to each of the four parts of length L/4, into which the said distance L is divided, consist of an adding and dividing unit. The analogue, continuous thickness signal delivered by the detector measuring the thickness is sent into the adding and dividing unit after said signal has been converted from an analogue signal to a digital signal by a converter; the outlet of the unit is connected through a first gate to a buffer storage which at every clock pulse of L/4 sends the stored information to charge in parallel the cell of the first shift register of the set of main shift registers; the adding and dividing unit is controlled by clock pulses of L/32 so that for every portion L/4 of the cloth piece it takes the arithmetic mean of the first eight thickness measurements delivered by the detector continuously measuring the thickness in each correspondence to advance of L/32 of the cloth piece.

According to another embodiment of the invention the said system for detecting the presence of a seam and for cancelling and replacing the spurious digital signals of the mean thicknesses comprises a trigger which is excited by the peak value of the analogue thickness signal corresponding to the seam, delivered by the said thickness detector system; the trigger and sends its output pulse into a set of three auxiliary shift registers connected in series and controlled by clock pulses of L/4. The parallel outlet of the first shift register of the set is connected to the inlet of said first gate. The outlet of the set of shift registers together with the outlet of the buffer storage is connected to the inlet of a second gate; the output signal of the second gate charges in parallel the cell of the second shift register of the set of main shift registers.

According to a still further embodiment of the invention, a system for anticipating the digital signal of the mean thickness corresponding to the part following the part containing the seam once said seam passes under the rotating shearing cylinder, comprises a microswitch commutating the inlet of a second buffer storage, connected to the said regulator through a digital analogue converter, from the parallel outlet of the fourth main shift register to the parallel outlet of the third main shift register of the set of main shift registers; this commutation occurs when the shearing comb is fully lowered to allow passage of the seam, said lowering of the comb being effected by the output pulse of the trigger through a delay unit.

The invention is illustrated in the accompanying drawings which show merely exemplary and non-limiting embodiments, in that the adoption of construction techniques or equivalent members different from those suggested herein lies within the scope of the present invention.

Figure 2:
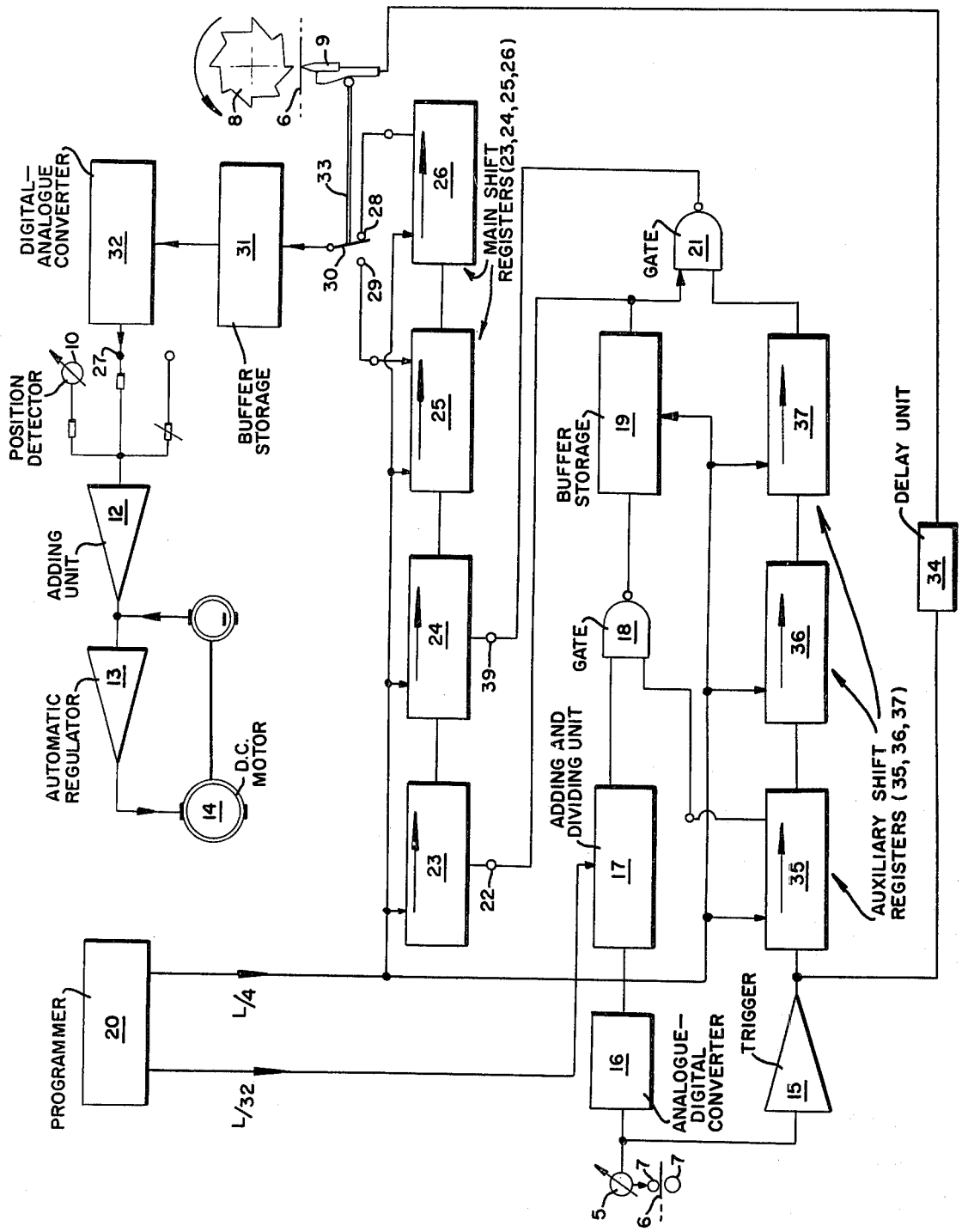
Figure 3:
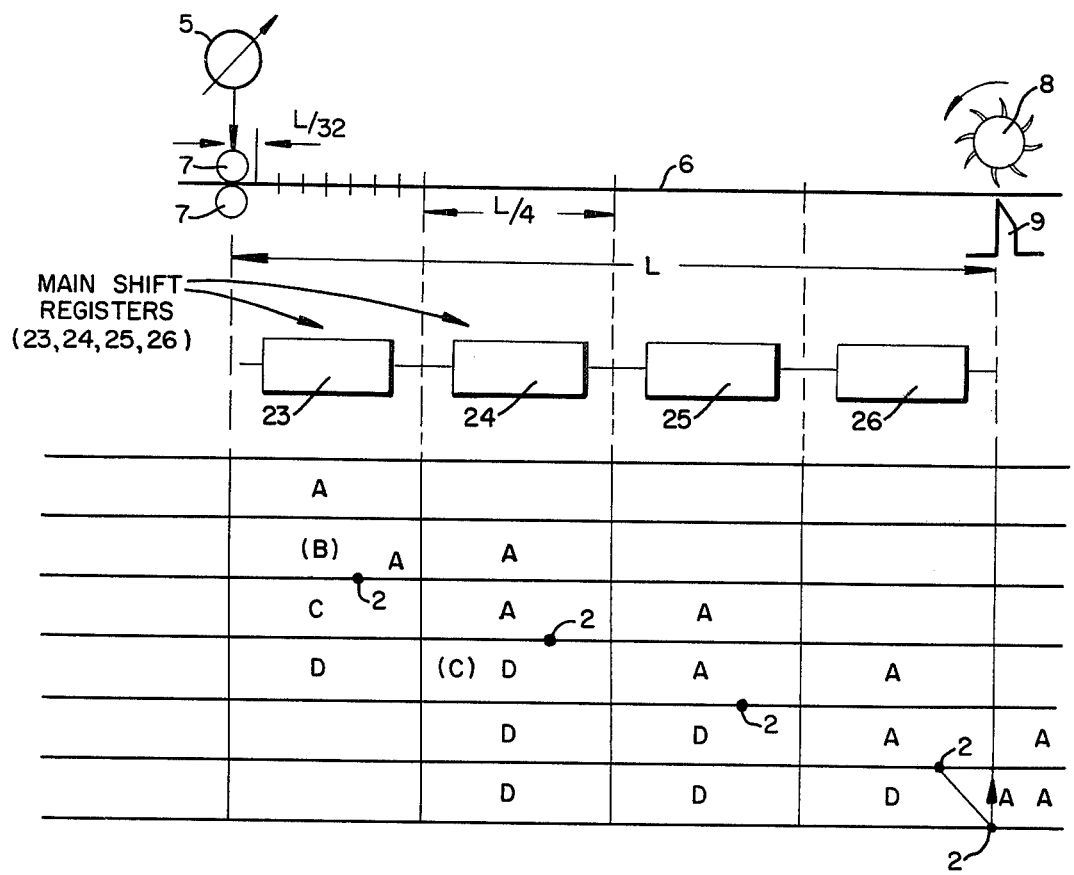

In said drawings:

FIG. 1 graphically shows the configuration of the thickness s along a cloth piece portion having a length L and containing a seam 2, more specifically the configuration of the actual thickness (curve 1), of the measured thickness (curve 3) and of the processed thickness (curve 4);

FIG. 2 synthetically shows the block diagram of the system for automatically and continuously adjusting the height of the sheared pile by making use of the electronic device for processing the thickness measurements according to the invention;

FIG. 3 is a diagram of the shiftings and processings of the detected mean thickness values through the various cells of the main shift registers according to the invention.

Referring to the Figures, reference numeral 5 indicates the detector system which measures continiously and in analogue fashion the thickness of a cloth piece 6 to be sheared, said system comprising a centesimal position detector, for example, a differential transformer applied on feeling rollers 7.

Said detector system 5 is located upstream from the rotating shearing cylinder 8 and acts on the cloth piece at a distance L from said cylinder. The adjustable distance s' (cutting or shearing slit) between cylinder 8 and the movable shearing comb 9 is detected and measured in analogue fashion by a centesimal position detector 10. The two analogue values s and s' measured by the two detectors are then sent, together with an analogue signal corresponding to the desired height of the pile delivered by the unit 11, into an adding unit 12 acting in a known way on a conventional automatic regulator 13 the d.c. motor 14 of the regulator adjust the lowering of comb 9 as a function of the thickness s of the cloth piece and of the desired height of the pile by means of suitable known couplings.

According to the present invention, the analogue, continuous thickness signal delivered by detector 5 is simultaneously sent to the inlets of a trigger 15 and an analogue-digital converter 16. The digital output signal of converter 16 is then sent to the inlet of an adding and dividing unit 17 whose outlet is connected to the inlet of a buffer storage 19 through a first gate 18. Unit 17 is controlled by clock pulses of L/32, i.e. pulses having a period of recurrence equal to the time required for cloth piece 6 to advance a length L/32; the buffer storage 19 is controlled by clock pulses of L/4, which clock pulses are supplied by a programmer 20 for advancing the thickness information in synchronism with the advance of the cloth piece.

In such a way distance L between detector 5 and shearing cylinder 8 is theoretically divided in four equal parts of length L/4 and from each of said parts adding and dividing unit 17 takes the arithmetic mean of eight thickness measurements. In fact, buffer storage 19 delivers output signals with a recurrence frequency of L/4, i.e. every time the cloth piece has shifted a length L/4, and the stored and delivered information is merely the arithmetic mean of the thickness measurements which unit 17 has added at every clock pulse of L/32 during this time interval; i.e., the first eight thickness measurements correspond to eight advances of a distance L/32 of the cloth piece, equalling a shift of L/4 of said cloth piece. In summary, adding and dividing unit 17 determines the digital, mean thickness values A, B, C and D (see FIG. 1) corresponding to each of the four cloth piece portions of a length L/4, into which the said distance L is divided.

The outlet of the buffer storage 19 is then connected to the inlet of a second gate 21 and to the parallel inlet 22 of the first main shift register 23 of a set of main shift registers equal in number to the parts into which said distance L is divided. The four main shift register 23, 24, 25 and 26 are connected in series and controlled by clock pulses of L/4 supplied by the programmer 20. In this way the mean thickness information recorded into the first main shift register 23 passes into the following main shift register at time intervals of L/4, i.e. in synchronism with the advance of the cloth piece. Hence, it is certain that said information is presented to the inlet 27 of the adding unit 12 in phase with the cloth piece, i.e. precisely when the corresponding cloth piece portion is under the rotating shearing cylinder.

The parallel outlets of the fourth main shift register 26 and of the third main shift register 25 are then connected to terminals 28 and 29 respectively of a microswitch 30 connected to the inlet of a second buffer storage 31; the outlet of said buffer storage is connected to the inlet 27 of unit 12 through a digital-analouge converter 32. Microswitch 30 is operated by comb 9, through a mechanical coupling 33 or the like, in such a way as to commutate from terminal 28 to terminal 29 only when comb 9 is lowered fully to allow the passage of a seam, said lowering being effectuated by the pulse of trigger 15 through a delay unit 34. On the other hand said output pulse of trigger 15, which pulse is generated only when the inlet of the trigger receives a peak value of the analogue thickness signal corresponding to a seam, is also sent to the inlet of a set of three auxiliary shift registers 35, 36 and 37 respectively; these registers are controlled by clock pulses of L/4 supplied by programmer 20, so that said output pulse is also shifted along the set of auxiliary shift registers in synchronism with the advance of the cloth piece.

Finally, the parallel outlet 38 of the first shift register 35 of the set of auxiliary shift registers is connected to the inlet of the first gate 18, while the outlet of the third auxiliary shift register 37 is connected to the inlet of the second gate 21. The outlet of gate 21 is connected to the parallel inlet 39 of the second shift register of the set of four main shift registers.

According to the invention, the operation of the electronic device in the presence of a seam is as follows:

When the first portion L/4 of the cloth piece, which precedes a seam 2 (see FIG. 1), passes between the feeling rollers 7 of the detector system 5, adding and dividing unit 17 takes the arithmetic mean of the first eight digital thickness measurements corresponding to advances of L/32 of the cloth piece, and stores the digital value A for the mean thickness of said cloth piece portion into buffer storage 19. As soon as said first piece portion has passed the detector system clock pulse L/4 transfers information A contained in buffer storage 19 to the first main shift register 23 (see specifically FIG. 3). Unit 17 then derives the digital value B for the mean thickness of the second cloth piece portion L/4 containing the seam 2, but said value B is not stored into buffer storage 19 since the analogue thickness signal due to seam 2 trips trigger 15; the output pulse of the trigger is recorded into the first auxiliary shift register 35 and closes gate 18. Therefore, when a new clock pulse L/4 arrives, the output pulse of trigger 15 passes from auxiliary shift register 35 to the following auxiliary shift register 36; information A passes from main shift register 23 to the next main shift register 24 (see FIG. 3) and into the first main shift register 23 is transferred the value contained in buffer storage 19, namely the mean thickness value A again. In such a way the spurious information B is cancelled.

Successively, unit 17 derives the digital value C for the mean thickness of the third cloth piece portion L/4, and stores said value into buffer storage 19. When the relevant clock pulse L/4 arrives, the output pulse of trigger 15 passes from auxiliary shift register 36 to the following auxiliary shift register 37, information A contained in main shift registers 23 and 24 passes into the following main shift registers 24 and 25 respectively (see FIG. 3) and said value C is transferred to main shift register 23. Finally, unit 17 derives and stores into buffer storage 19 the digital value D for the mean thickness of the fourth cloth piece portion L/4, which value is transferred into the first main shift register 23 at the relevant clock pulse L/4, while the items of information already contained in the main shift registers take a step forward. Consequently, into the fourth main shift register there will be stored the value A, into the third main shift register the value A again, into the second main shift register the value C and into the first main shift register the value D (see FIG. 3).

On the other hand, at the latter clock pulse L/4 the output of trigger 15 comes out from auxiliary shift register 37 and opens gate 21. The information D stored in buffer storage 19 is therefore also transferred to the second main shift register 24 where it automatically cancels and replaces the previously contained information C.

In summary, at this point corresponding to the moment when the said first cloth piece portion L/4 is presented to the shearing cylinder 8, in the first main shift register 23 there is recorded the value D, in the second main shift register 24 the value D again, in the third main shift register 25 the value A, and in the fourth main shift register 26 the value A again (see FIG. 3). The latter digital value A, on the other hand, is stored through microswitch 30 into buffer storage 31, converted to an analogue signal by converter 32 and sent to regulator 13 which adjusts the distance between shearing cylinder 8 and comb 9 so as to obtain proper shearing of said cloth piece portion.

At the next clock pulse L/4 corresponding to the moment when the second cloth piece portion L/4 containing seam 2 is presented before the shearing cylinder 8, the items of information contained in the main shift registers again take a step forward; therefore into fourth shift register 26 there is stored the value A, into the third shift register the value D and into the second shift register the value D again (see FIG. 3). Consequently, an analogue signal corresponding to digital value A is again sent to regulator 13. The distance between the shearing cylinder and the comb hence is not varied during the passage through the comb 9 of said second cloth piece portion until seam 2 arrives at the comb. At this moment delay unit 34 delivers a pulse which fully lowers comb 9 and consequently commutates microswitch 30. As a result of said commutation the value A contained in the fourth shift register 26 is no longer transferred to buffer storage 31; rather the value contained in the third shift register 25, i.e. the value D (see FIG. 3), is transferred to said buffer storage so that, as soon as seam 2 passes beyond the comb 9, regulator 31 adjusts the height of the shearing slit according to said value D, which remains unvaried during the two following phases.

In summary, the electronic device of the present invention processes the information delivered by detector system 5 measuring the thickness in such a way as to send to inlet 27 of the adding unit 12 a fictitious thickness signal whose configuration is represented by curve 4 in FIG. 1, thus assuring, as aforementioned, a precise and uniform shearing of a cloth piece even near the seams.

It is evident that when no seam is present in the cloth piece, trigger 15 is not excited by a peak value; consequently the logic part of the electronic device which is controlled by the output pulse of said trigger (i.e. the three auxiliary shift registers 35, 36 and 37, the two gates 18 and 21, the delay unit 34 and the microswitch 30) remains inactive. The set of main shift registers then only the function to delay the mean thickness values delivered by adding and dividing unit 17 and stored into buffer storage 19, in such a way as to present said values to regulator 13 in phase with the relevant cloth piece portions.

It is to be further recognized that all possible variations known by those skilled in the art may be utilized in exemplary embodiment above-described without departing from the scope of the present invention. Thus, for example, in order to obtain more precise thickness measurement, distance L may be divided into a greater number of parts; one need only remark that a corresponding number of shift registers should be utilized and that the logic units be controlled with clock pulses having a period of recurrence equal to the time required by the cloth piece to advance a length equal to each parts into which said distance L is divided, so that the information is always shifted into the shift registers in synchronism with the advance of the cloth piece.

What is claimed is:

1. A device for use in conjunction with a shearing apparatus for automatically and continuously adjusting the height of the sheared pile of cloth pieces, comprising:

detector means to measure continuously in analogue fashion the thickness of the cloth, said detector means being located at a certain distance L along the cloth before it reaches the shearing cylinder-comb unit;

analogue measuring means to measure the width of the adjustable shearing slit defined between said shearing cylinder and said comb; and regulator means to adjust automatically the width of said shearing slit as a function of the analogue values delivered by said detector means and by said analogue measuring means, and as a function of the desired value for the height of the sheared pile;

said analogue values being delivered by said detector means to said regulator means through an electronic digital device comprising:

a plurality of main shift registers, said registers being controlled by clock pulses having a period of recurrence equal to the time interval required for the cloth to advance a length equal to the distance L divided by the number of main shift registers;

means for taking the arithmetic means of the digital thickness signals corresponding to each successive part of cloth of said length;

means for detecting the presence of a seam and for cancelling and replacing the spurious digital mean thickness signal corresponding to the part containing the seam with the digital mean thickness signal for the part immediately preceding the part containing the seam, and for cancelling and replacing the spurious mean thickness signal for the part immediately following the part containing the seam with the signal for the part next following said part;

and means for cancelling and replacing, as soon as the seam passes the shearing cylinder-comb unit, the new digital mean thickness signal for the part containing the seam with the digital signal for the part immediately following said part following the part containing the seam.

2. A device according to claim 1, wherein said means for taking the arithmetic mean of the digital thickness signals corresponding to each successive part of cloth of said length comprises:

analogue-digital converter means for converting the analogue, continuous thickness signal delivered by said detector means into a digital signal;

adding and dividing means into which said digital signal is delivered; and buffer storage means into which the output of said adding and dividing means is delivered through a first gate, the output of said buffer storage means being connected to the inlet of the first shift register of said plurality of main shift registers, said buffer storage means being controlled by clock pulses having a period of recurrence equal to that of the clock pulses controlling the main shift registers, and said adding and dividing means being controlled by clock pulses with a period of recurrence equal to some whole fraction of said period of recurrence for the pulses controlling the main shift registers.

3. A device according to claim 2, wherein the number of main shift registers is four, said shift registers being controlled by clock pulses having a period of recurrence equal to the time interval required for the cloth to advance a length L/4, and said adding and dividing unit being controlled by clock pulses having a period of recurrence equal to one-eighth of said period of recurrence of the pulses controlling said main shift registers.

4. A device according to claim 2, wherein said means for detecting the presence of a seam and for cancelling and replacing the associated spurious digital mean thickness signals, comprises:

trigger means excited by the peak value of the analogue thickness signal corresponding to a seam and delivered by said detector means, the outlet of said trigger means being connected to a set of three auxiliary shift registers, said auxiliary shift registers being controlled by clock pulses having a period of recurrence equal to the time interval required for the cloth to travel a length equal to the distance L divided by the number of maian shift registers, a parallel output of the first auxiliary shift register being connected to the inlet of said first gate, and the outlet of the set of auxiliary shift registers being connected, together with the outlet of said buffer storage means, to the inlet of a second gate whose outlet is connected to the parallel inlet of the second main shift register of said plurality of main shift registers.

5. A device according to claim 4 wherein said system for cancelling and replacing, as soon as the seam passes the shearing cylinder-comb unit, the new digital mean thickness signal corresponding to the part containing the seam, comprises switching means commutating the inlet of a second buffer storage means from the outlet of the last main shift register to the parallel outlet of the penultimate main shift register of said plurality of main shift registers;
said second buffer storage means being connected to said regulator means through digital-analogue converter means, and
said commutation occurring when the shearing comb is fully lowered to allow the passage of the seam, said lowering being effected by the output pulse of said trigger means through delay means.

* * * * *

UNITED STATES PATENT AND TRADEMARK OFFICE
CERTIFICATE OF CORRECTION

PATENT NO. : 3,941,986
DATED : March 2, 1976
INVENTOR(S) : Nicola Santucci

It is certified that error appears in the above-identified patent and that said Letters Patent are hereby corrected as shown below:

Sheet 2, FIG. 2, the reference numeral 11 should be applied to the analogue signal unit which appears to the left of and on the line below inlet 27 of unit 12.

In the Title, "A Shearing" should read --The Sheared--; col. 1, line 4, "A Shearing" should read --The Sheared--; col. 1, line 17, insert --a-- before "cloth"; col. 1, line 23, insert --(-- before second occurrence of "the" col. 1, line 24, insert --)-- after "slit"; col. 1, line 64, cancel "a"; col. 2, line 4, "adjust" should read --adjusts--; col. 2, line 12, cancel "that"; col. 2, line 23, insert --,-- after "example"; col. 2, line 37, "passing" should read --passes--; col. 2, line 61, cancel second occurrence of "for" and substitute --of--; col. 2, line 62, delete ";" col. 3, line 5, "L/40" should read --L/4--; col. 3, line 6, insert --thickness-- before "information"; col. 3, line 27, cancel "each"; col. 3, line 28, insert --each-- before "advance"; col. 3, line 35, delete "and"; col. 4, line 30, insert --;-- after "13"; col. 5, line 2, "register" should read --registers- col. 7, line 14, insert --has-- before "only".

Claim 1, col. 7, line 59, second occurrence of "means" should read --mean--; Claim 4, col. 8, line 52, "maian" should read --main--.

Signed and Sealed this eighth Day of June 1976

[SEAL]

Attest:

RUTH C. MASON
Attesting Officer

C. MARSHALL DANN
Commissioner of Patents and Trademarks